(12) United States Patent
Renner et al.

(10) Patent No.: US 6,998,874 B2
(45) Date of Patent: Feb. 14, 2006

(54) METHOD AND APPARATUS FOR THE TRANSMISSION OF DIFFERENTIAL SIGNALS

(75) Inventors: Franz Renner, Wörth (DE); Jens Rosenbusch, Unterhaching (DE)

(73) Assignee: Infineon Technologies AG, Munich (DE)

( * ) Notice: Subject to any disclaimer, the term of this patent is extended or adjusted under 35 U.S.C. 154(b) by 156 days.

(21) Appl. No.: 10/093,721

(22) Filed: Mar. 8, 2002

(65) Prior Publication Data

US 2002/0145448 A1    Oct. 10, 2002

Related U.S. Application Data

(63) Continuation of application No. PCT/DE00/02955, filed on Aug. 28, 2000.

(30) Foreign Application Priority Data

Sep. 8, 1999    (DE) ................................ 199 42 942

(51) Int. Cl.
*H03K 19/0175* (2006.01)
(52) U.S. Cl. .............................. 326/86; 326/90; 326/83
(58) Field of Classification Search ............ 326/82–83, 326/86, 90

See application file for complete search history.

(56) References Cited

U.S. PATENT DOCUMENTS

| 4,121,118 A | | 10/1978 | Miyazaki |
| 5,568,515 A | * | 10/1996 | Wincn ......................... 375/257 |
| 6,028,467 A | * | 2/2000 | Burrows et al. ............ 327/331 |

FOREIGN PATENT DOCUMENTS

EP    0 606 888 A2    7/1994

* cited by examiner

*Primary Examiner*—Anh Q. Tran
(74) *Attorney, Agent, or Firm*—Laurence A. Greenberg; Werner H. Stemer; Ralph E. Locher

(57) ABSTRACT

A method is described for transmitting signals on a pair of lines, whereby the signals pass alternately from a low level to a high level. The signals on one line of the pair transmit a complementary level of signals to the other line of the pair, whereby signal drivers are used in a manner to affect an exchange in the levels of the transmitted signals. First, the signal drivers that send complementary levels of signals to the two lines are isolated from the lines. Second, the lines are short-circuited so that an identical intermediary potential between the low-level and the high-level signal, is applied. Third, the short-circuit is removed and the signal drivers are connected so that inversely complementary levels of signals can be sent to both lines.

3 Claims, 1 Drawing Sheet

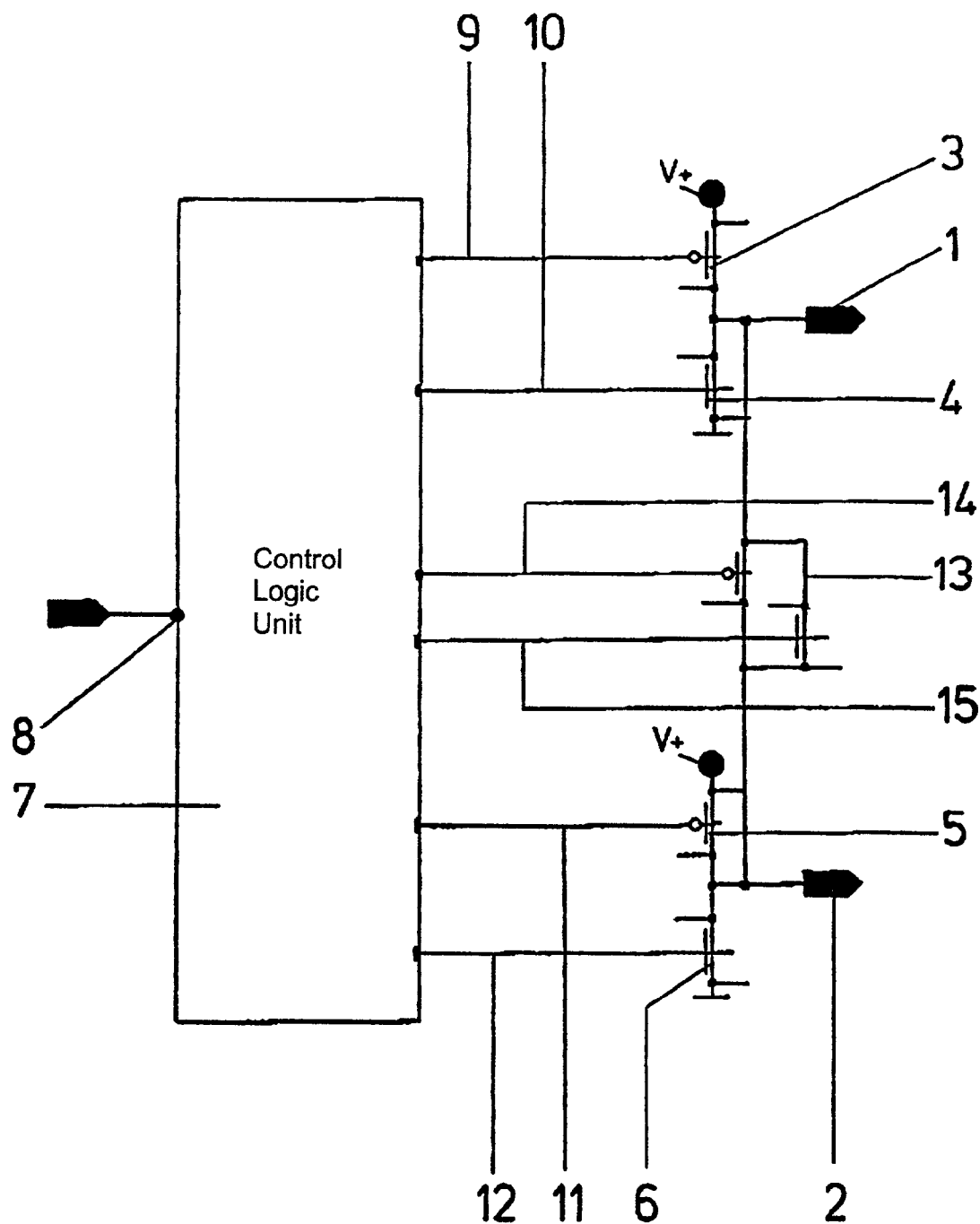

METHOD AND APPARATUS FOR THE TRANSMISSION OF DIFFERENTIAL SIGNALS

CROSS-REFERENCE TO RELATED APPLICATION

This application is a continuation of copending International Application No. PCT/DE00/02955, filed Aug. 28, 2000, which designated the United States.

BACKGROUND OF THE INVENTION

FIELD OF THE INVENTION

The invention relates to a method for transmitting signals that alternately carry low and high levels on line pairs. The signals on one line of a line pair carries a signal level complementary to that of the signals on the other line of the line pair. Signal drivers are used for the level change of the transmitted signals. The invention also relates to a circuit for carrying out this method.

Differential signal transmission is increasingly being used for the signal transmission of signals that alternately carry low and high levels. Signal line pairs whose two lines transmit complementary signal states are used in differential signal transmission. Examples that may be mentioned here are twisted pair signal transmissions or clock signals on integrated circuits. On account of the complementary signal transmission on a line pair, it is necessary to reverse the charge of the signal states on the respective line cyclically, i.e. in the event of the transition from the high state to the low state on the two lines. The charge-reversal process is affected by signal drivers, which are loaded to a great extent by the charge-reversal process and thus have a relatively large current consumption. In addition, the charge-reversal process is associated with interference radiation (EMC).

SUMMARY OF THE INVENTION

It is accordingly an object of the invention to provide a method and an apparatus for the transmission of differential signals which overcome the above-mentioned disadvantages of the prior art methods and devices of this general type, which ensures at least a reduced interference radiation and a lower current consumption and is carried out cost-effectively and reliably.

With the foregoing and other objects in view there is provided, in accordance with the invention, a method for transmitting signals that alternately carry low and high levels on line pairs. The signals on a first line of a line pair carry a signal level complementary to that of the signals on a second line of the line pair. The method includes the steps of: using signal drivers for changing a level of the signals, isolating the signal drivers that apply complementary signal levels to the first and second lines of the line pair, short-circuiting the first and second lines of the line pair to put the first and second lines at an identical intermediate potential having a value between the low and high signal levels, and removing the short circuit and connecting the signal drivers for an application of oppositely complementary signal levels to the first and second lines.

The object is achieved with regard to the method by virtue of the fact that the signal drivers are used for the level change of the transmitted signals. The signal drivers that apply complementary signal levels to the two lines are isolated and a mutual short-circuiting of the two lines of the line pair is applied for putting the two lines at an identical intermediate potential between the low and high signal levels. The short circuit is removed and the connection of the signal drivers for the application of oppositely complementary signal levels to the two lines is reapplied.

Whereas it has hitherto been the case during the charge reversal of the signal level states on the two lines of the line pair that the respective energy level previously present on the lines has had to be dissipated by the assigned signal drivers and be built up again with an opposite sign, the method according to the invention obviates the dissipation of the energy stored in the lines by the signal drivers. The intermediate step is replaced, according to the invention, by mutual short-circuiting of the lines of the line pair in order to put them at an identical intermediate potential between the low and high signal levels, i.e. at the zero level. Only then are the signal drivers activated again in order to build up respective complementary signal levels in the lines, but proceeding from the intermediate level that is favorable in respect of energy. Since the intermediate level does not have to be provided with the aid of the signal drivers, the method according to the invention is associated with an energy-saving effect with a saving of current amounting to 50% in comparison with the previous procedure. Moreover, since the previous changeover of the signal drivers under load is obviated—the signal drivers are activated again only when the lines carry an identical intermediate potential—the activation of the signal drivers is not associated with the hitherto harmful interference radiation (EMC).

In accordance with an added mode of the invention, there is the step of performing the removing of the short circuit and the connecting of the signal drivers steps for the application of the oppositely complementary signal levels to the first and second lines, as soon as, the identical intermediate potential lying between a first potential representing the low level and a second potential representing the high level has formed on the first and second lines.

With the foregoing and other objects in view there is further provided, in accordance with the invention, a circuit for transmitting complementary signals on a line pair having a first line and a second line. The circuit contains a control logic unit, signal leads connected to the control logic unit and including a first signal lead, a second signal lead, a third signal lead, and a fourth signal lead. Switches are provided and include a first switch connected to the first signal lead and to the first line. The first switch is provided for applying a high level potential to the first line of the line pair. A second switch is connected to the second signal lead and to the second line. The second switch is provided for applying a low level potential to the first line of the line pair. A third switch is connected to the third signal lead and to the second line. The third switch is provided for applying the low level potential to the second line of the line pair. A fourth switch is connected to the fourth signal lead and to the second line. The fourth switch is provided for applying the high level potential to the second line of the line pair. At least one short-circuiting switch is connected to the line pair for short-circuiting the first line to the second line. The control logic unit actuates the switches and the short-circuiting switch such that, for a signal transmission, either the first switch and the third switch or the second switch and the fourth switch are put in a conducting state resulting in conducting switches, while remaining ones of the switches and the short-circuiting switch are put in a non-conducting state. For a level change, the conducting switches in the conducting state are put in the non-conducting state and the short-circuiting switch is put in the conducting state and, afterward, the remaining ones of the switches is put in the conducting state and the short-circuiting switch is put in the non-conducting state again. The conducting switches that were first put in the conducting state continue to be held in the non-conducting state as directly before the level change.

In accordance with an additional feature of the invention, the control logic unit puts the short-circuiting switch in the non-conducting state, and puts either the first switch and the third switch or the second switch and the fourth switch in the conducting state, as soon as an intermediate potential lying between the low level potential and the high level potential is formed on the first line and the second line.

In accordance with a concomitant feature of the invention, a first terminal is provided for receiving the high level potential and is connected to the first switch and to the fourth switch. A second terminal is provided for receiving the low level potential and is connected to the second switch and to the third switch.

The switches utilized in the circuit according to the invention can be realized in a wide variety of ways. Semiconductor switches are preferred for energy reasons and reasons of service life.

Other features which are considered as characteristic for the invention are set forth in the appended claims.

Although the invention is illustrated and described herein as embodied in a method and an apparatus for the transmission of differential signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a circuit block diagram diagrammatically showing an embodiment of a circuit for carrying out the method according to the invention.

DESCRIPTION OF THE PREFERRED EMBODIMENTS

Referring now to the single FIGURE of the drawing, there is shown a circuit for transmitting signals that alternately carry low and high levels by differential signal routing on two signal lines 1, 2 of a signal line pair. The circuit contains a control logic unit 7 for driving the lines 1, 2 via switches (also referred to as signal drivers) 3, 4, 5, 6 for feeding the respective signal level state to the lines 1, 2 of the differentially supplied line pair. In detail, the circuit, for feeding signals to the lines 1, 2, contains a respective pair of switches, namely the pair of switches 3, 4 for the first line 1 and the pair of switches 5, 6 for the second line 2. The switches 3, 4 and 5, 6 are connected in series between a positive supply voltage $V_+$ and ground. The switches 3–6 are driven by the control logic unit 7, which, for its part, is controlled via an input 8 by a non-illustrated external apparatus, via control lines 9, 10 and 11, 12. In detail, the switch 3 is controlled by the control logic unit 7 via the control line 9. The switch 4 is controlled by the control logic unit 7 via the control line 10. The switch 5 is controlled by the control logic unit 7 via the control line 11, and the switch 6 is controlled by the control logic unit 7 via the control line 12. The line 1 is connected to the interconnected switch outputs of the switches 3, 4. In a similar manner, the line 2 is connected to the interconnected switch outputs of the switches 5, 6.

The control logic unit 7 drives the switches or signal drivers 3, 4 and 5, 6 in such a way that when a high level is present on the line 1, a complementary low level is present on the complementary line 2, and vice versa. In detail, the signal state on the lines 1, 2 is set as follows. The switches 3 and 4, which are directly connected to the positive voltage supply, provide the high level in the closed (conducting) state, while the switches 4 and 6, which are directly connected to ground, provide the low level in the switched-on state. This is done under the control of the control logic unit 7, as stated above. If the line 1 carries the high level and the line 2 carries the low level, accordingly the switch 3 and the switch 6 are controlled into a conducting state by the control logic unit 7 via the control lines 9, 12, while the further switches 4 and 5 are non-conducting through the associated control lines 10, 11. For the case where the low level is present on the line 1 and the high level complementary to this is present on the line 2, the switches 4 and 5 are conducting and the switches 3 and 6 are non-conducting, in each case again controlled via the control lines 9 to 12 by the control logic unit 7.

Thus far, the circuit corresponds to the prior art, which is afflicted with the disadvantage that in the event of the changeover of the level applied to the lines 1, 2 by the switches (signal drivers) 3–6, the latter are loaded accordingly; i.e. the signal drivers or switches 3–6 must first dissipate the energies stored in the lines and thereupon build up and apply opposite levels.

In order to avoid this, a short-circuiting switch 13 is provided according to the invention. The short-circuiting switch 13, which contains two switching elements in the embodiment illustrated, is connected to the control logic unit 7 via control lines 14, 15.

The control logic unit 7 now controls the switches (signal drivers) 3–6 including the short-circuiting switch 13 as now described. If the levels on the lines 1, 2 are intended to be changed over into opposite complementary levels on account of an input signal at the input 8 of the control logic unit, the two currently conducting switches 3, 6 or 4, 5 are put to a non-conducting state, so that all of the switches 1 to 6 are non-conducting, whereupon the short-circuiting switch 13, which is non-conducting during normal operation, is conducting by the control logic unit 7 and thus connects together or mutually short-circuits the two lines 1, 2, to be precise with the formation of an intermediate potential on the two lines 1, 2 between the low and high levels (zero level). As soon as the intermediate potential has been formed, the short-circuiting switch 13 is opened (non-conducting) and the other pair of switches 4, 5 is closed (conducting), while the first-mentioned pair 3, 6 now remains open (non-conducting). As a result, the new signal level is driven on the lines 1, 2 without the drivers or switches 3 to 6 being loaded during the level changeover in order to dissipate the energy carried on the lines 1, 2.

We claim:

1. A method for transmitting signals which alternately carry low and high levels on line pairs, the signals on a first line of a line pair carrying a signal level complementary to that of the signals on a second line of the line pair, which comprises the steps of:

using signal drivers for changing a level of the signals;

isolating the signal drivers that apply complementary signal levels to the first and second lines of the line pair;

short-circuiting the first and second lines of the line pair to put the first and second lines at an identical intermediate potential having a value between the low and high signal levels; and as soon as the intermediate potential has been formed, removing the short circuit and activating the signal drivers only when and as soon as the lines carry the intermediate potential for application of oppositely complementary signal levels to the first and second lines without the drivers being loaded during the level changeover to dissipate energy carried on the lines.

2. A circuit for transmitting complementary signals on a line pair having a first line and a second line, the circuit comprising:

a control logic unit, signal leads connected to said control logic unit and including a first signal lead, a second signal lead, a third signal lead, and a fourth signal lead;

switches, including:
- a first switch connected to said first signal lead and to the first line, said first switch for applying a high level potential to the first line of the line pair;
- a second switch connected to said second signal lead and to the second line, said second switch for applying a low level potential to the first line of the line pair;
- a third switch connected to said third signal lead and to the second line, said third switch for applying the low level potential to the second line of the line pair; and
- a fourth switch connected to said fourth signal lead and to the second line, said fourth switch for applying the high level potential to the second line of the line pair; and at least one short-circuiting switch connected to the line pair for short-circuiting the first line to the second line for putting the first and second line at an identical potential lying between the low level potential and the high level potential;

said control logic unit actuating said switches and said short-circuiting switch such that, for a signal transmission, either said first switch and said third switch or said second switch and said fourth switch being put in a conducting state resulting in conducting switches, while remaining ones of said switches and said short-circuiting switch being put in a non-conducting state, and that, for a level change in the high level and low level potentials, said conducting switches in the conducting state being put in the non-conducting state and said short-circuiting switch being put in the conducting state and, as soon as the intermediate potential lying between the low level potential and the high level potential being formed on said first line and said second line, said remaining ones of said switches being put in the conducting state and said short-circuiting switch being put in the non-conducting state again, said conducting switches that were first put in the conducting state continuing to be held in the non-conducting state as directly before the level change.

3. The circuit according to claim 2, further comprising:

a first terminal for receiving the high level potential and connected to said first switch and to said fourth switch; and a second terminal for receiving the low level potential and connected to said second switch and to said third switch.

* * * * *